March 6, 1951    D. C. ECKENBECK ET AL    2,544,304
PLUG-NUT
Filed Dec. 9, 1946

INVENTORS
DANA C. ECKENBECK
PHILIP E. SLAUGHTER
CHARLES L. MADDEN
BY
H. F. Woodward
Attorney Patented Mar. 6, 1951

2,544,304

UNITED STATES PATENT OFFICE 2,544,304

PLUG NUT

Dana C. Eckenbeck, Philip E. Slaughter, and Charles L. Madden, Minneapolis, Minn.

Application December 9, 1946, Serial No. 714,974

5 Claims. (Cl. 85—32)

This invention relates to improvements in plug-nuts adapted to be applied to plates, castings and the like; to provide secure fastening means therein for bolts and/or other members and elements.

In the manufacture and fabrication of various structures, particularly those comprising parts composed of relatively soft materials, difficulties are often encountered in supplying such structures with secure fastenings for tie-bolts. Among these difficulties, is the difficulty frequently met in threading a bolt receiving hole in a plate or the like in which the worker has been able to drill with comparative ease. Another difficulty resides in the relative weakness of both fastenings when threaded in a threaded hole, and this is particularly true where the hole is formed in a relatively thin and/or soft plate material. A still further difficulty resides in the frequent necessity of providing bosses on relatively thin and/or soft plate and castings to supply sufficient material in the bolt fastening threads to meet the contemplated strain upon the bolt.

Another object of the present invention is to provide simple, durable and inexpensive plug-nut or fastening means which is adapted to be readily applied to the work and which efficiently overcomes the various difficulties frequently met in applying nuts to relatively thin and/or soft plates and the like.

With the foregoing and other objects in view which will appear in the following specification, the invention resides in the novel combination and arrangement of parts and/or the details of construction hereinafter described and claimed.

Figure 1:
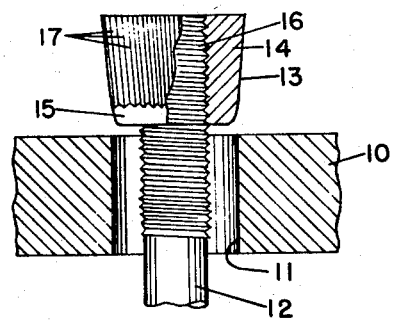
Figure 1 is a view illustrating a form of plug-nut in embodiment of the invention; the same being shown partly in elevation and partly in section; said view further illustrating a cross section portion of the plate with a hole drilled therein to receive the plug-nut and illustrating further a bolt threaded into said plug-nut.

The plug-nut is designed so that the tapered lip can be easily inserted into a straight hole. The plug-nut may be seated in the hole by various means, for example, driven by hammer or mallet; seated by kick or power press; and pulled home by the bolt.

When seated the plug-nut becomes fixed in the work so that the bolt or other securing means may be removed and re-inserted at will. The tapered lip may be of less depth than the thickness of the material in which the nut is seated. Since the plug-nut does not need a wrench to hold it during assembly with the bolt, it may be furnished without a head or with a round head instead of a hexagonal head. The plug-nut has been successfully applied to cast iron, cast steel, to flat rolled steel, to cast aluminum, to aluminum alloys, to brass sheets and rods, to plastics and other materials. Also, the plug-nut has been successfully applied to a material with a thickness not greater than .022 inch.

Under dynamic and static loads the plug-nut is substantially stronger than standard or other accepted nut forms. The upper part of the nut is stiffer than the lower portion. This design tends to carry a larger tensile load on the upper threads than does the ordinary nut. The tapered lip of the nut being always in tension helps to fill the gap between the tensile strain of the bolt and the compressive load of the nut. This strength factor also exists and increases when the bolt is stretched. Furthermore, when the plug-nut is fixed in the work and the bolt is turned into the nut, a torquing stretching of the bolt occurs. This action can strengthen the bolt and by proper stretching, eliminate a large part of any loosening due to vibrations.

The plug-nut takes advantage of the strength of the material into which it is inserted to provide cross sectional strength. The strength in tension and the realized stretching of the bolt produces a stronger fastening than any obtained by means heretofore known.

The plug-nut provides many advantages over the other types of nuts. For example:

1. The plug-nut may be driven out of the work and re-inserted in the same hole or in case of thread stripping or deformation, a new nut may be easily inserted and seated in the same hole.

2. The plug-nut is self-centering.

3. The plug-nut after seating leaves a flat surface for abutting or mating parts without requiring embossing of the material.

4. The plug-nut may be inserted by hand driving or by pulling in with the bolt which is a great advantage if replacement becomes necessary.

5. The plug-nut weighs about twenty percent less than the usual nut of similar strength, generally.

Since the plug-nut penetrates the work with a tapered lip, it carries greater thread depth than a standard nut when its body projects an equal distance above the surface. This allows the use of aluminum alloy nuts in many applications where weight saving is a factor. Such nuts may save approximately sixty percent of the weight of the usual nuts without strength loss and in modern transportation planes, this saving could amount to well over four hundred pounds.

In many assemblies such as partitions, cabinets, panels, coach and locomotive bodies and cabs, bridge and rail assemblies, ship construction, large machines, etc., one man cannot reach and/or handle both ends of a nut and bolt assembly.

In some instances the new nut can be driven into the work on the job or pulled into the work by the bolt or pressed in during pre-assembly, thereby eliminating one wrench and the time and wages of the man who uses it. The speed and saving of power wrenches can seldom be fully realized unless nuts are affixed to the work before assembly. The new plug-nut effects these economies. Because the plug-nut becomes part of the work into which it is inserted and may have any depth of any threaded area desired, it makes bossing for tapping purposes unnecesary, generally.

In some instances the use of the new plug-nut permits the lightening of the material now used where present thickness is determined not by load bearing but rather by tapping requirements. In cases where multiple tapping of casting or parts occur, parts scrapping from broken taps or stripped threads, bad holes, etc., may be eliminated by the use of the new plug-nut in straight drilled or otherwise formed holes. This is an important factor in the maintenance of such castings or parts during disassembly and repair, in some instances make unnecessary the common practice of plugged holes due to stripping, thread deformation, broken bolts, etc.

In machine design, it is frequently expensive and difficult to make both the nut and bolt readily accessible to wrenches for disassembly, part changes or repair. The use of the plug-nut allows simplification of design since only the bolt must be reached by the wrench. Frequently space for a protruding nut is a problem in machine design. In such instances, plug-nuts which penetrate the work with threaded lip and protrude a lesser distance than standard nuts of equal strength solve the problem. When the plug-nut penetrates the work into which it is inserted under substantial compression, the tapered lip derives strength from the surrounding material.

Reference being had to the accompanying drawing, in which 10 designates a plate or a portion of the castings and in said plate 10 is a hole 11 formed as by drilling or otherwise; the transverse cross sectional dimensions of said hole being substantially uniform. Designed to be seated in the hole 11 and to provide a secure fastening means for a bolt, as at 12, is a plug-nut 13. The body 14 of this plug-nut 13 is in the form of a frustum, the form shown being a frusto-conical. At the smaller end of the body 14 is a reduced and relatively sharply tapered pilot portion 15. Said plug-nut may be provided with a threaded axial bore 16 for the thread reception of the bolt 12; and the body 14 externally thereof, is formed with a knurling providing short, sharp teeth 17 extending longitudinally of the body 14. The root diameter of the tooth body 14 at its smaller end, is substantially the same as the diameter of the hole 11 in the plate 10; and the taper of said body 14 though relatively slight in substantially all cases will vary more or less depending upon the various conditions obtaining in respect to any particular plate and plug-nut. It is to be understood that knurling is used only in certain limited instances, but normally knurling is not needed.

When the insert 13 is applied to the plate 10, the pilot portion 15 of the insert guides the body 14 into the hole 11 and then proceeding with the seating of plug-nut 13 in the hole 11, the material of the plate 10 is deformed substantially entirely around the hole. Upon the seating of the plug-nut body 14 in said hole 11, substantially and circumferentially continuous deformation of the plate material will be produced about the hole and an annularly complete gripping action effected thereby between the plate and plug-nut sufficiently strong alone to hold the plug-nut firmly and securely in the plate.

Figure 2:
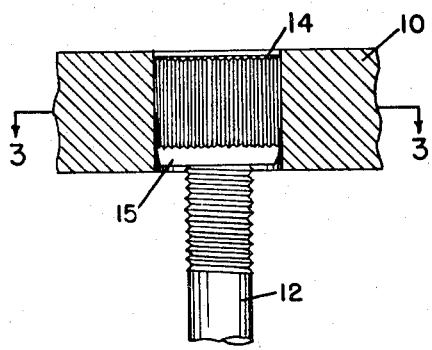
Figure 2 is a view illustrating the plate, plug-nut and bolt shown in Figure 1.
Figure 3:
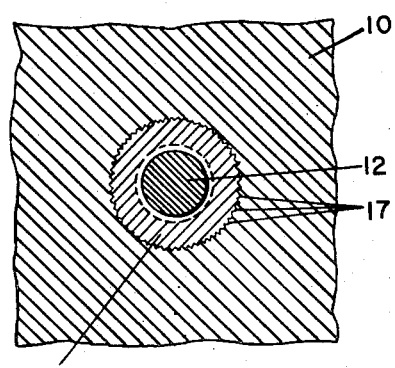
Figure 3 is a sectional view taken along line 3—3 of Figure 2.

While the plug-nut may be press seated into the hole 11 in a plate 10 under circumstances admitting of such procedure, it will be readily comprehended that said plug-nut may be drawn into seated position shown in Figure 2 by a bolt such as bolt 12, assuming of course, that such bolt though rotatable is axially held. From the foregoing it will be appreciated that the plug-nut 13 seated within the hole 11 in the plate 10 provides a fastening for a bolt 12 and one that ordinarily will be more secure than a fastening consisting merely of threads fitting said bolt and cut in the material of the plate 10. Also, it will be appreciated that it might be difficult under some circumstances if not impossible, even to thread a hole in plate 10 after probable formation of such hole therein. It will be further appreciated that the simple fastening afforded by the plug-nut 13 readily will be strengthened equal to fastening threads formed in the plate proper and continuing into a portion formed on the plate to provide additional threads for strength. Still further, it will be appreciated that a hole drilled or punched anywhere in a plate or the like at any stage in production of any given work may be conveniently fitted with a plug-nut of the kind shown in the drawings to provide a secure bolt fastening.

Obviously the plug-nut may be inexpensively produced in large quantities as in automatic lathes or otherwise whereby the cost of providing bolt fastenings of this nature will be extremely low.

Figure 4:
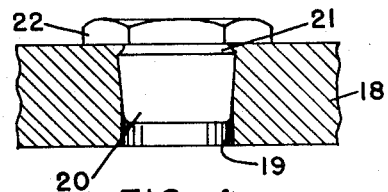
Figure 4 is a sectional view through a plate showing a plug-nut in the plate with the plug-nut provided with an undercut.

In Figure 4 is shown a plate 18 in which a straight hole 19 is either drilled or punched to standard tolerance. The plug-nut 20 during seating in the hole 19 causes the metal of the plate 18 to flow into the undercut 21 and to be internally staked or locked in place in the plate. The undercut 21 is located generally adjacent the head 22.

Figure 5:
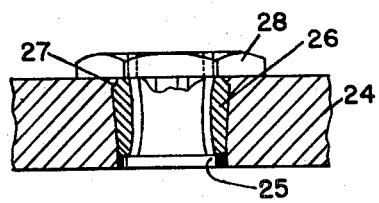
Figure 5 is a view of a plug-nut which is provided with a knurled taper and an undercut.

The plug-nut shown in Figure 5 is similar to that shown in Figure 4 but instead of the simple taper, there is provided a knurled taper.

Figure 6:
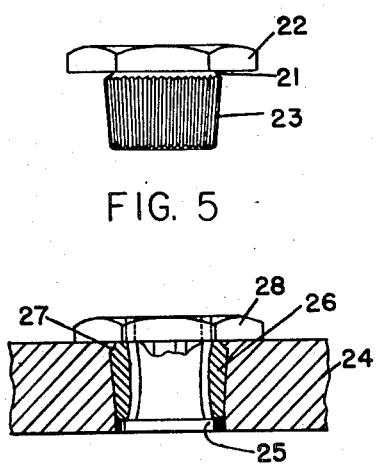
Figure 6 is a view of another form of the plug-nut inserted into the plate which is shown in cross section.

When a plug-nut penetrates the work into which it is inserted under substantial compression, this taper lip derives strength from the surrounding material. In applications where this surrounding material is of comparative thickness in relation to the nut bore, a relatively thin wall on the taper lip may be used. When a thin wall on the taper is used compression on the threaded diameter of the tapered lip results. This compression can be accomplished to a point where a definite locking action results. Where disassembly is not contemplated or where disassembly will occur only a few times, such a nut as shown in Figure 6 affords in addition to all the other features of the plug-nut, a cheap and satisfactory locking action. This action is inherent in all plug-nuts to some degree, irrespective of the wall thickness of the taper lip. Generally speaking a nut tapped to a number 2 fit approximates a number 3 fit when inserted in the work.

In Figure 6 a member 24 is shown in section and has a substantially straight hole 25 therein. The plug-nut 26 is shown with relatively thin walls. Adjacent the head 28 is provided an undercut 27.

Figure 7:
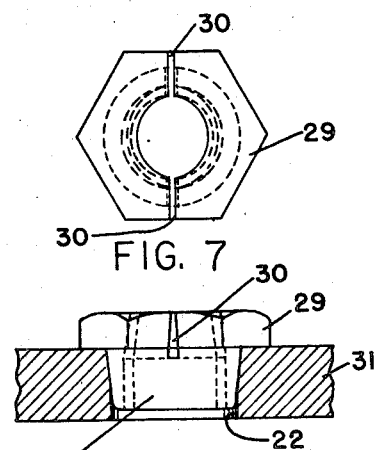
Figure 7 is a top plan view of a plug-nut provided with a slotted head.
Figure 8:
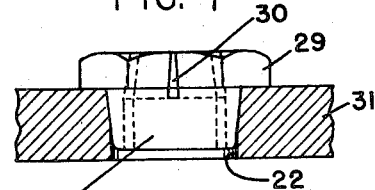
Figure 8 is a view showing a plug-nut of the type shown in Figure 7 positioned in the plate.

In applications where greater locking action is needed than can be obtained by the use of a plug-nut shown in Figure 6, a plug-nut with a slotted head as shown in Figures 7 and 8 may be employed. These nuts give a greater locking action than do simple compression. Satisfactory torque is retained through many insertions and withdrawals of the bolt. The greatest locking action is exerted by the upper threads of the nut and a bolt may be started by hand. The slot headed plug-nut provides a combination "anchor lock" nut and "lock nut" suitable for a wide variety of uses, at a comparatively low cost.

In member 31 is shown a substantially straight hole 22 in which plug-nut 33 is inserted. The slots 30 may vary in number as the need dictates, but two are shown in Figures 7 and 8. It is important that the slots extend to a point below the head 29 of the nut and this is clearly shown in Figure 8.

For the purpose of this application there has been set forth certain structures and arrangements, but it is to be understood that they are here presented for illustrative purposes only and are not to be accorded any interpretations such as might have the effect of limiting what is claimed as the invention short of its true and comprehensive scope in the art.

It is to be understood that the tapered shank which simulates a frustum may be plain or knurled and that the inserts and/or plug-nuts shown in Figures 4, 5, 6, 7, and 8, may be used with an undercut groove, but for some uses the undercut groove may be omitted.

The term straight hole when used in the specification and claims means a drilled, punched or otherwise formed hole having the transverse cross-sectional dimension substantially uniform.

It can be seen from the drawings that the plug-nut or insert is not substantially deformed upon seating, while the material of the plate about the hole is deformed upon the seating of the insert; in other words, the insert or plug-nut is stronger or is of greater resistance to compressive deformation than the material of the plate about the hole to expansive deformation.

What we claim:

1. In combination, a plate having a cylindrical hole therein, an insert having a head and a frusto-conical outer surface portion having its small end of a diameter substantially equal to but of less diameter than the diameter of the hole, a threaded bore in the insert and said insert being of greater resistance to deformation than the resistance of the material of the plate to deformation, with a recess adjacent the said head, the taper of the frusto-conical portion from the small end being such that upon enforced seating, small end foremost in the hole, substantial deformation of the plate material will be produced about the hole without substantial deformation of the frusto-conical portion and the material of the plate will flow into said recess.

2. In combination, a plate having a hole of substantially uniform transverse cross-sectional dimension therein, an insert having a head and a frustrum-shaped outer surface portion having its small end of a diameter substantially equal to but less than the diameter of the hole, the insert machined for receiving a mating member, the insert being of less diameter between the head and the larger end of the frustrum-shaped portion to provide an undercut portion, the insert being of greater resistance to compressive deformation than the material of the plate to expansive deformation, the taper of the frustrum-shaped portion from the small end being such that upon enforced seating, small end foremost in said hole, substantial deformation of the plate material about the hole will be produced without substantial deformation of the frustrum-shaped portion and with the material of the plate flowing into said undercut.

3. In combination, a plate having a hole of substantially uniform transverse cross-sectional dimensions therein, an insert having a head and a frustrum-shaped outer surface portion with an undercut recess therein, and said frustrum-shaped portion of a diameter in a plane adjacent the small end thereof substantially equal to the diameter of the hole, the insert threaded for receiving a mating member, the insert of greater resistance to compressive deformation than the plate to expansive deformation, the taper of the frustrum-shaped portion from the small end being such that upon enforced seating, small end foremost in said hole, substantial deformation of the plate material about the hole will be produced without substantial deformation of the frustrum-shaped portion and with the material of the plate flowing into the undercut recess.

4. In combination, a plate having a cylindrical hole therein, an insert having a split head and a frustrum-shaped outer surface portion and having its diameter in a plane adjacent the small end substantially equal to the diameter of the hole, the insert machined for receiving a mating member, the insert having stronger resistance to deformation than the plate to deformation, the frustrum-shaped portion from the small end being such that upon enforced seating, small end foremost in said hole, substantial deformation of the plate material about the hole will be produced without substantial deformation of the frustrum-shaped portion.

5. In combination, a plate having a hole of substantially uniform transverse cross-sectional dimensions therein, an insert having a head and a frustrum-shaped outer surface portion with an undercut recess therein, said frustrum-shaped portion of a diameter in a plane adjacent the small end thereof substantially equal to the diameter of the hole, the insert machined for receiving a mating member, the insert of greater resistance to compressive deformation than the plate to expansive deformation, the taper of the frustrum-shaped portion from the small end being such that upon enforced seating, small end foremost in said hole, substantial deformation of the plate material about the hole will be produced without substantial deformation of the frustrum-shaped portion and the material of the plate flowing into the undercut recess, said frustrum-shaped portion of the insert having serrations therein.

DANA C. ECKENBECK.
PHILIP E. SLAUGHTER.
CHARLES L. MADDEN.

REFERENCES CITED

The following references are of record in the file of this patent:

UNITED STATES PATENTS

| Number | Name | Date |
|---|---|---|
| 1,104,864 | Ballou | July 28, 1914 |
| 1,207,413 | Kennedy | Dec. 5, 1916 |
| 1,681,048 | Purcell | Aug. 14, 1928 |
| 2,017,154 | Larkin | Oct. 15, 1935 |
| 2,154,116 | Thomas | Apr. 11, 1939 |
| 2,181,550 | Haupt | Nov. 28, 1939 |
| 2,254,502 | Thomas et al. | Sept. 2, 1941 |
| 2,307,080 | Schaefer | Jan. 5, 1943 |
| 2,321,466 | Crouther | June 8, 1943 |
| 2,371,927 | Schmidt | Mar. 20, 1945 |
| 2,490,594 | Madden | Dec. 6, 1949 |

FOREIGN PATENTS

| Number | Country | Date |
|---|---|---|
| 708,468 | France | May 4, 1931 |
| 366,079 | Italy | Dec. 19, 1938 |